US006078882A

United States Patent [19]

Sato et al.

[11] Patent Number: 6,078,882

[45] Date of Patent: Jun. 20, 2000

[54] METHOD AND APPARATUS FOR EXTRACTING SPEECH SPURTS FROM VOICE AND REPRODUCING VOICE FROM EXTRACTED SPEECH SPURTS

[75] Inventors: Nobuki Sato, Saitama; Takamasa Tomono; Makoto Aoki, both of Tokyo; Jina Baek, Chiba, all of Japan

[73] Assignee: Logic Corporation, Tokyo, Japan

[21] Appl. No.: 09/093,926

[22] Filed: Jun. 9, 1998

[30] Foreign Application Priority Data

Jun. 10, 1997 [JP] Japan .................................... 9-152570

[51] Int. Cl.[7] .................................................... G10L 15/20

[52] U.S. Cl. ............................................ 704/233; 704/226

[58] Field of Search .................................... 704/233, 226, 704/227, 228, 200, 210, 201

[56] References Cited

U.S. PATENT DOCUMENTS

| | | | |
|---|---|---|---|
| 4,331,837 | 5/1982 | Soumagne | 704/215 |
| 4,720,802 | 1/1988 | Damoulakis et al. | 395/2.42 |
| 5,533,133 | 7/1996 | Lamkin et al. | 381/94.5 |
| 5,646,991 | 7/1997 | Sih | 379/410 |
| 5,649,055 | 7/1997 | Gupta et al. | 704/233 |
| 5,708,722 | 1/1998 | Forgues et al. | 381/94.1 |
| 5,722,086 | 2/1998 | Teitler et al. | 455/561 |
| 5,870,397 | 3/1999 | Elofsson et al. | 455/115 |
| 5,881,373 | 2/1999 | Chauffour et al. | 370/435 |

*Primary Examiner*—Richemond Dorvil

*Attorney, Agent, or Firm*—Ostrolenk, Faber, Gerb & Soffen, LLP

[57] ABSTRACT

Identification information of a speech spurt, hangover and pause is used to indicate that a digital voice signal is the speech spurt, hangover or pause. While the identification information of a speech spurt, hangover and pause is indicative of the speech spurt, a voice level adjuster does not attenuate the digital voice signal, and the voice signal/third signal combiner mixes it with a third signal which undergoes the maximum attenuation through a third signal level adjuster. While the identification information of a speech spurt, hangover and pause is indicative of the hangover, the voice level adjuster gradually attenuates the digital voice signal. This is because the level of the voice signal is expected to be high in the first half of the hangover period, but to decay in its latter half to such a level that it is dispensable for speech recognition. A third signal (noise), on the other hand, is gradually increased in the latter half of the hangover period to preserve the continuity in the transition from the speech spurt to a pause, thus achieving smooth transition to the pause. This makes it possible to reduce as much as possible the unnaturalness involved in switching between speech spurts and pauses, thereby improving the quality of the reproduced voice.

7 Claims, 9 Drawing Sheets

ASSIGNMENT OF IDENTIFICATION INFORMATION IN VOICE PACKET

| CASES | CONDITIONS DURING VOICE PACKET TRANSMISSION | |
|---|---|---|
| | VOICE DATA | CONTROL HEADER |
| SPEECH SPURT | PRESENT | TURN OFF HANGOVER INDICATOR |
| HANGOVER | PRESENT | TURN ON HANGOVER INDICATOR |
| PAUSE | NO VOICE PACKET IS SENT | |

*FIG.3*

METHOD AND APPARATUS FOR EXTRACTING SPEECH SPURTS FROM VOICE AND REPRODUCING VOICE FROM EXTRACTED SPEECH SPURTS

This application is based on Patent Application No. 152,570/1997 filed on Jun. 10, 1997 in Japan, the content of which is incorporated hereinto by reference.

BACKGROUND OF THE INVENTION

1. Field of the Invention

The present invention relates to a voice packet communication or a voice storing and processing, which extracts speech spurts from a voice signal, and reproduces the voice signal from the extracted speech spurts.

2. Description of the Related Art

A technique that extracts speech spurts from a voice signal has been widely employed by many apparatuses and systems because of its advantage of being able to make efficient use of communication network facilities or voice storing facilities owing to its effective use of information to be transmitted or stored.

It is important for this technique to reproduce a voice signal resembling natural speech as much as possible. Speech spurt detection in a background noise environment like an air conditioned one, for example, will cause the receiving side to reproduce, during the speech spurts, the background noise along with the significant speech. The background noise, however, is not reproduced during pauses in which no significant speech is present, which results in unnatural feeling as if the speech was clipped although it is intelligible. In particular, a long pause will mislead the party into thinking that the call has been hung up.

To solve this problem, the following methods are applied to alleviate the unnaturalness.

(1) The transmission side observes the signal level of the background noise, and the receiving side inserts the noise matching the observed signal level during the pauses.

(2) The voice signal during intervals decided as pauses is reproduced in hangover periods. Here, the hangover period refers to a short period following the transition from a speech spurt to a pause.

(3) The transmission side transfers the noise level to the receiving side, and the receiving side reproduces the noise of that level during the pauses.

It is known that the technique (2) is particularly effective.

Although the techniques (1) and (3) can reduce the unnaturalness to some extent, the noise inserted into the pauses differs in general from the background noise because it changes depending on the environment of the transmitting side. As a result, in some cases, they cannot fully relieve the unnaturalness because of perceptible changes in sound quality at the transitions between the speech spurts and pauses in the reproduced voice signal.

SUMMARY OF THE INVENTION

It is therefore an object of the present invention to improve the quality of the reproduced voice by reducing as much as possible the unnaturalness at the transitions between the speech spurts and pauses.

In a first aspect of the present invention, there is provided a speech spurt extraction and speech reproduction method comprising the steps of, at a speech spurt extraction side:

extracting speech spurts consisting of significant speech in a voice signal;

extracting speech during hangover periods defined as a particular period immediately following transitions of the speech spurts to pauses;

measuring incoming external noise levels during the pauses; and producing an extracted voice signal consisting of the extracted speech spurts and extracted speech during the hangover periods, producing measured results of the external noise levels, and producing information for identifying the speech spurts, hangover periods and pauses, and at a speech reproduction side:

deciding the speech spurts, hangover periods and pauses;

generating a third signal from the external noise levels transmitted;

adjusting levels of the extracted voice signal during the hangover periods;

adjusting the third signal during the hangover periods; and producing during the speech spurts the extracted voice signal, producing during the hangover periods a mixture of the extracted voice signal and the third signal, which undergo adjustment, and producing in the pauses the third signal.

In a second aspect of the present invention, there is provided a speech spurt extraction method comprising the steps of:

extracting speech spurts consisting of significant speech in a voice signal;

extracting speech during hangover periods defined as a particular period immediately following transitions of the speech spurts to pauses;

measuring incoming external noise levels during the pauses; and producing an extracted voice signal consisting of the extracted speech spurts and extracted speech during the hangover periods, producing measured results of the external noise levels, and producing information for identifying the speech spurts, hangover periods and pauses.

In a third aspect of the present invention, there is provided a voice reproduction method for reproducing a voice signal from an extracted voice signal consisting of speech spurts and speech during a hangover periods, from measured results of external noise levels, and from information for identifying the speech spurts, hangover periods and pauses, the voice reproduction method comprising the steps of:

generating a third signal from the external noise levels transmitted;

adjusting levels of the extracted voice signal during the hangover periods;

adjusting the third signal during the hangover periods; and producing during the speech spurts the extracted voice signal, producing during the hangover periods a mixture of the extracted voice signal and the third signal, which undergo adjustment, and producing in the pauses the third signal.

In a fourth aspect of the present invention, there is provided a speech spurt extraction apparatus comprising:

voice level measuring means for detecting speech spurts consisting of significant speech in a voice signal, and for measuring incoming external noise levels during pauses;

voice extracting means for extracting the speech spurts and speech during hangover periods defined as a particular period immediately following transitions of the speech spurts to the pauses; and output means for producing an extracted voice signal consisting of the extracted speech spurts and extracted speech during the hangover periods, for producing measured results of the external noise levels, and for producing information for identifying the speech spurts, hangover periods and pauses.

Here, the output means may produce a voice packet with a header to which the information for identifying the speech spurts, hangover periods and pauses is added.

In a fifth aspect of the present invention, there is provided a voice reproduction apparatus for reproducing a voice signal from an extracted voice signal consisting of speech spurts and speech during a hangover periods, from measured results of external noise levels, and from information for identifying the speech spurts, hangover periods and pauses, the voice reproduction apparatus comprising:

a signal generator for generating a third signal in response to the external noise levels transmitted;

voice level adjuster for adjusting levels of the extracted voice signal during the hangover periods;

a third signal level adjuster for adjusting the third signal during the hangover periods;

a mixer for mixing the voice signal and the third signal, which undergo the level adjustments; and a combiner for producing during the speech spurts the extracted voice signal, for producing during the hangover periods a mixture of the extracted voice signal and the third signal, which undergo the level adjustments, and for producing in the pauses the third signal.

Here, the voice reproduction apparatus may receive the voice packet with a header to which the information for identifying the speech spurts, hangover periods and pauses is added.

Thus, the present invention is characterized in that:

(1) the transmitting side generates, when transmitting the voice signal, information that enables the receiving side to identify the speech spurts and hangover periods; and (2) the receiving side controls, when reproducing the voice signal during the speech spurts, hangover periods and pauses, the mixing ratio between the received voice signal and the third signal the receiving side generates.

This makes it possible to reproduce listenable voice because of the gradual changes between the speech spurts and pauses, instead of the sudden, disagreeable changes.

As a result, the present invention can be applied to a communication system or voice storing system that detects the speech spurts and utilizes them, not only to make efficient use of its facilities and apparatuses, but also to achieve high quality reproduction of the voice signal.

The above and other objects, effects, features and advantages of the present invention will become more apparent from the following description of the embodiment thereof taken in conjunction with the accompanying drawings.

BRIEF DESCRIPTION OF THE DRAWINGS

FIG. 3 is a table illustrating an example of the identification information of a voice packet;

DETAILED DESCRIPTION OF PREFERRED EMBODIMENT

The invention will now be described with reference to the accompanying drawings, taking an embodiment in which the present invention is applied to a voice packet communication. The voice packet communication is a communication scheme capable of making more effective use of communication network facilities than the conventionally applied time division multiplex because of statistical multiplexing effect involved in transmitting only speech spurts in the information transmission of a voice signal.

Figure 1:
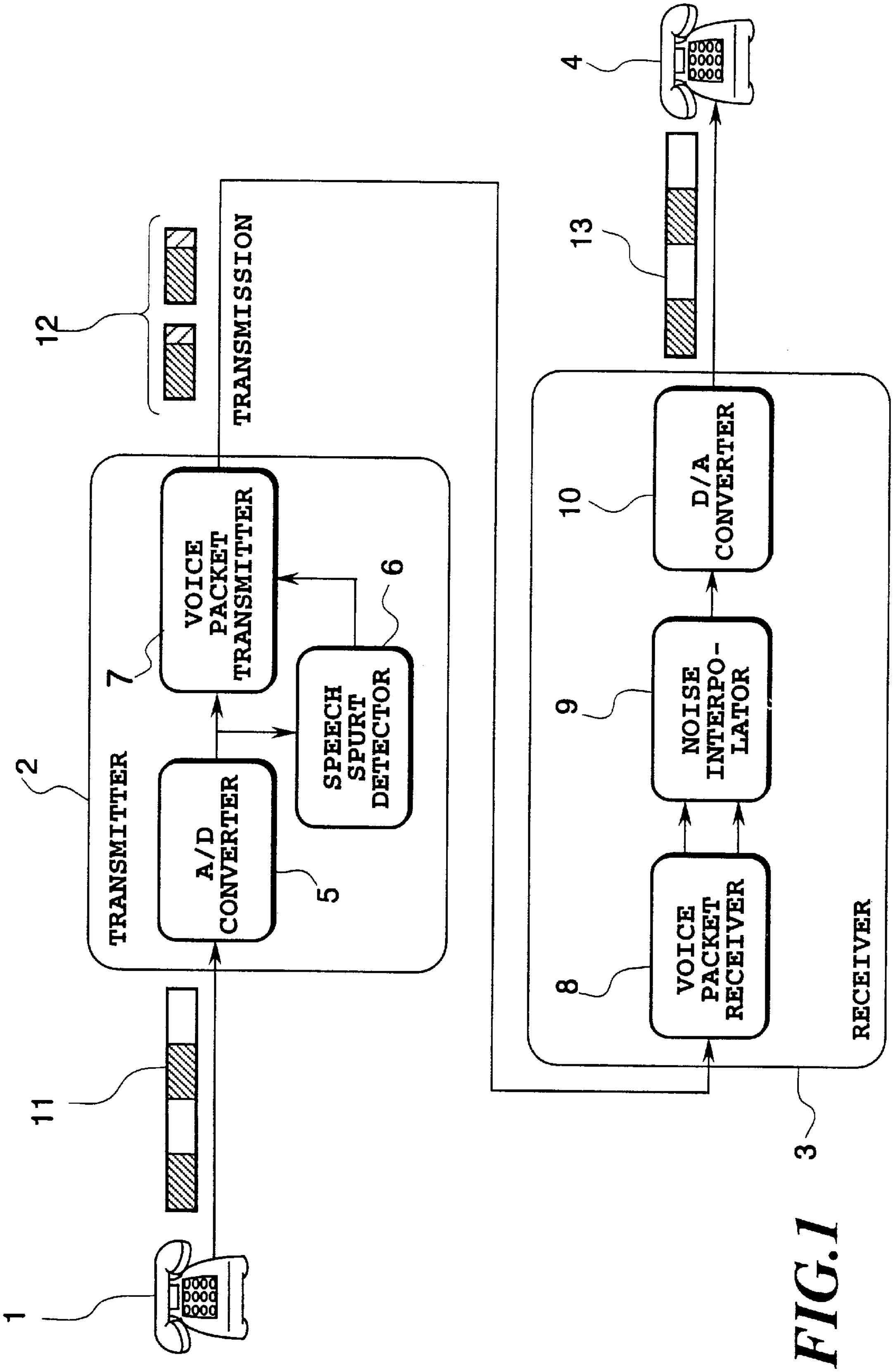
FIG. 1 is a block diagram showing an embodiment of a voice packet communication system to which the present invention is applied.

FIG. 1 is a block diagram showing a configuration of an embodiment of a voice packet communication system in accordance with the present invention.

In FIG. 1, the reference numeral 1 designates an apparatus for converting voice (acoustic waves) into an electrical signal (analog signal), which is usually a telephone set. The reference numeral 2 designate a transmitter that converts the analog voice signal fed from the telephone set 1 into a digital signal, extracts only speech spurts (speech spurt detection), and carried out packet transmission control. The reference numeral 3 designate a receiver that receives the packets transmitted from the transmitter 2, reproduces the speech spurts from the packets, interpolates pauses (pause interpolation) between the speech spurts to produce a digital voice signal, and converts the digital voice signal into an analog voice signal. The reference numeral 4 designates an apparatus for converting the analog voice signal fed from the receiver 3 into voice, that is, a telephone set similar to the telephone set 1.

In the transmitter 2, the reference numeral 5 designates a converter for converting the analog signal to a digital signal. The reference numeral 6 designates a speech spurt detector for identifying in the voice signal the speech spurts, hangover periods and pauses. The speech spurt detector 6 also measures the level of the background noise in the pauses. The reference numeral 7 designates a voice packet transmitter that assembles, when a decision is made from identification information supplied from the speech spurt detector 6 that the extracted voice signal is the speech spurts or hangover, packets by adding, to the voice signal, voice packet control information including a code for distinguishing the speech spurts from the hangover periods, and transmits them to a party. The voice packets are assembled every fixed time (32 ms, for example) interval. The voice packet control information includes additional information such as the sequence number of the packet, and information about the level of the background noise in the pauses. The sequence numbers of the packets are inconsecutive because they are also incremented during the pauses. The detailed operation of the voice packet transmitter 7 will be described later.

In the receiver 3, the reference numeral 8 designates a voice packet receiver that extracts, in the order opposite to that of the voice packet transmitter 7, the speech spurts and voice packet control information from the received voice packet. In addition, it identifies the pauses in such a way that if the next packet does not arrive for a particular time period after a packet indicating the hangover period has arrived, as in the case where the speech spurt detector 6 of the transmitter 2 detects the pause, it makes a decision that the pause begins. It makes a decision of the end of the pause or pauses by examining the sequence numbers of the received voice packets to detect the skipped numbers, and by determining the intervals associated with the skipped numbers as the pauses. The extracted voice signal, information for identifying speech spurts, hangover and pauses, and information on background noise are provided to the noise interpolator 9. The noise interpolator 9 generates a third signal which is noise in general, and inserts it in the pauses. The detailed operation of the noise interpolator 9 will be described later. The reference numeral 10 designates a converter for converting the digital voice signal to an analog voice signal. In an analog voice signal 11 sent from the telephone set 1 as shown in FIG. 1, the shaded portions represent the speech spurts, whereas the blank spaces represent the pauses. The reference numeral 12 each designate a voice packet transmitted from the transmitter 2 to the receiver 3, in which the voice packet control information represented by the coarsely shaded portion is added to the speech spurt. The voice packets 12, when restored by the receiver 3, become an analog voice signal 13.

Figure 2:
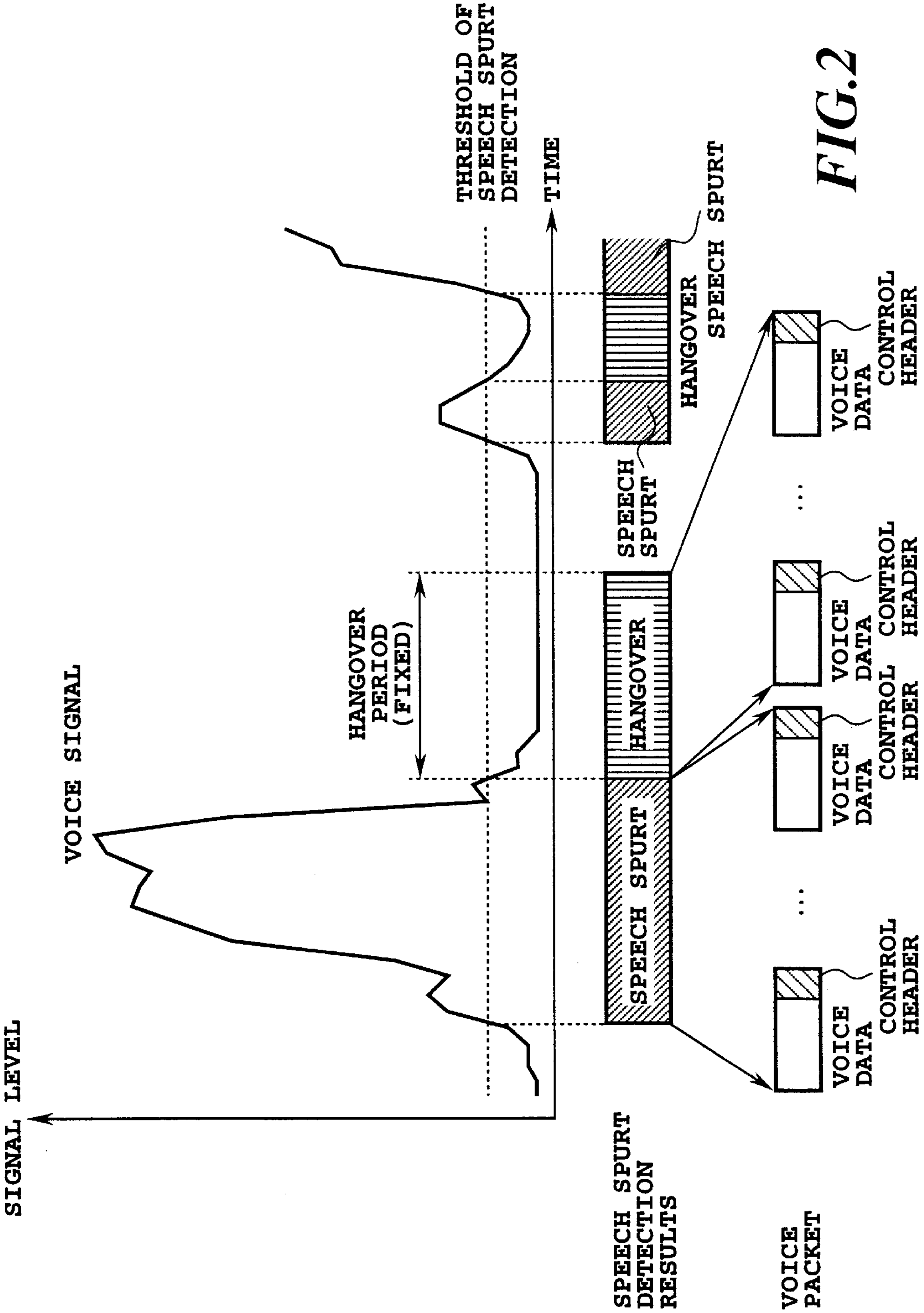
FIG. 2 is a diagram illustrating an operation of a voice packet transmitter.

Next, the operation of the voice packet transmitter 7 will be described with reference to FIG. 2. The speech spurt detector 6 detects the speech spurts exceeding a threshold value as significant voice, and provides them to the voice packet transmitter 7, as described above. Receiving them, the voice packet transmitter 7 extracts a voice signal composed of the speech spurts and the hangover periods, each of which is defined as a fixed length segment following the transition from a speech spurt to a pause. Subsequently, the voice packets are assembled from the extracted voice signal, and are sent to the receiving side.

In assembling the voice packet, its header that stores its control information is provided with an identification signal so that the receiving side can identify whether the voice packet is associated with the speech spurt or the hangover period. An example of this is shown in FIG. 3 which illustrates that the control header includes a flag representing whether a hangover indicator is ON or OFF. The hangover indicator represents that the voice packet is associated with the speech spurt when it is OFF, and that the voice packet is associated with the hangover period when it is ON. Of course, they can be indicated by other means.

The header of the voice packet includes additional information indicating the level of the background noise in the pause, and the sequence number indicating the order in which the voice packet is assembled. The sequence numbers are successively counted even during the pauses so that they are skipped by some numbers corresponding to the pauses.

Next, the voice reproduction operation at the receiving side will be described in detail.

Figure 4:
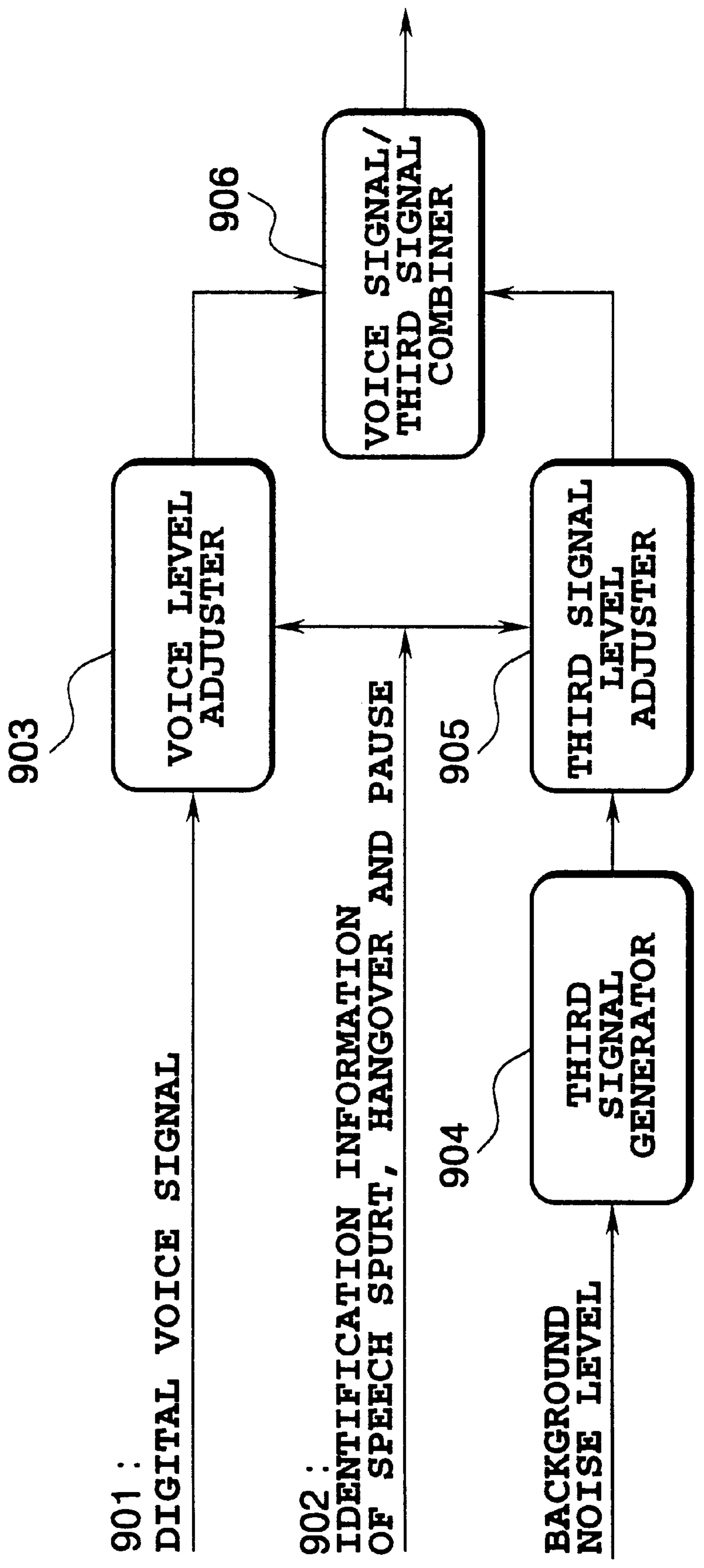
FIG. 4 is a block diagram showing a configuration of a noise interpolator.

FIG. 4 shows a detailed configuration of the noise interpolator 9 as shown in FIG. 1. In FIG. 4, the reference numeral 901 designates the digital voice signal fed from the voice packet receiver 8; and 902 designates the identification information of the speech spurt, hangover and pause. The reference numeral 903 designates a voice level adjuster for controlling the level of the voice signal regenerated during the hangover periods. The reference numeral 904 designate a third signal generator for generating the third signal (white noise, for example) to be inserted into the pauses in accordance with the background noise level provided from the voice packet receiver 8. The reference numeral 905 designates a third signal level adjuster for controlling the level of the third signal to be added during the hangover periods; and 906 designates a voice signal/third signal combiner for combining the voice signal output from the voice level adjuster 903 with the third signal output from the third signal level adjuster 905.

The operation will now be described of the receiver 3 with the foregoing arrangement.

When the receiver 3 receives the voice packet transmitted from the transmitter 2, the voice packet receiver 8 simultaneously supplies the noise interpolator 9 with the digital voice signal 901 and identification information 902 of the speech spurt, hangover and pause. Although it is difficult to uniquely determine the level of the voice and that of the noise output during the pauses, and a mixing ratio between the voice signal and the third signal, because they depend on the liking of a user, one control example will be described here.

Figure 5:
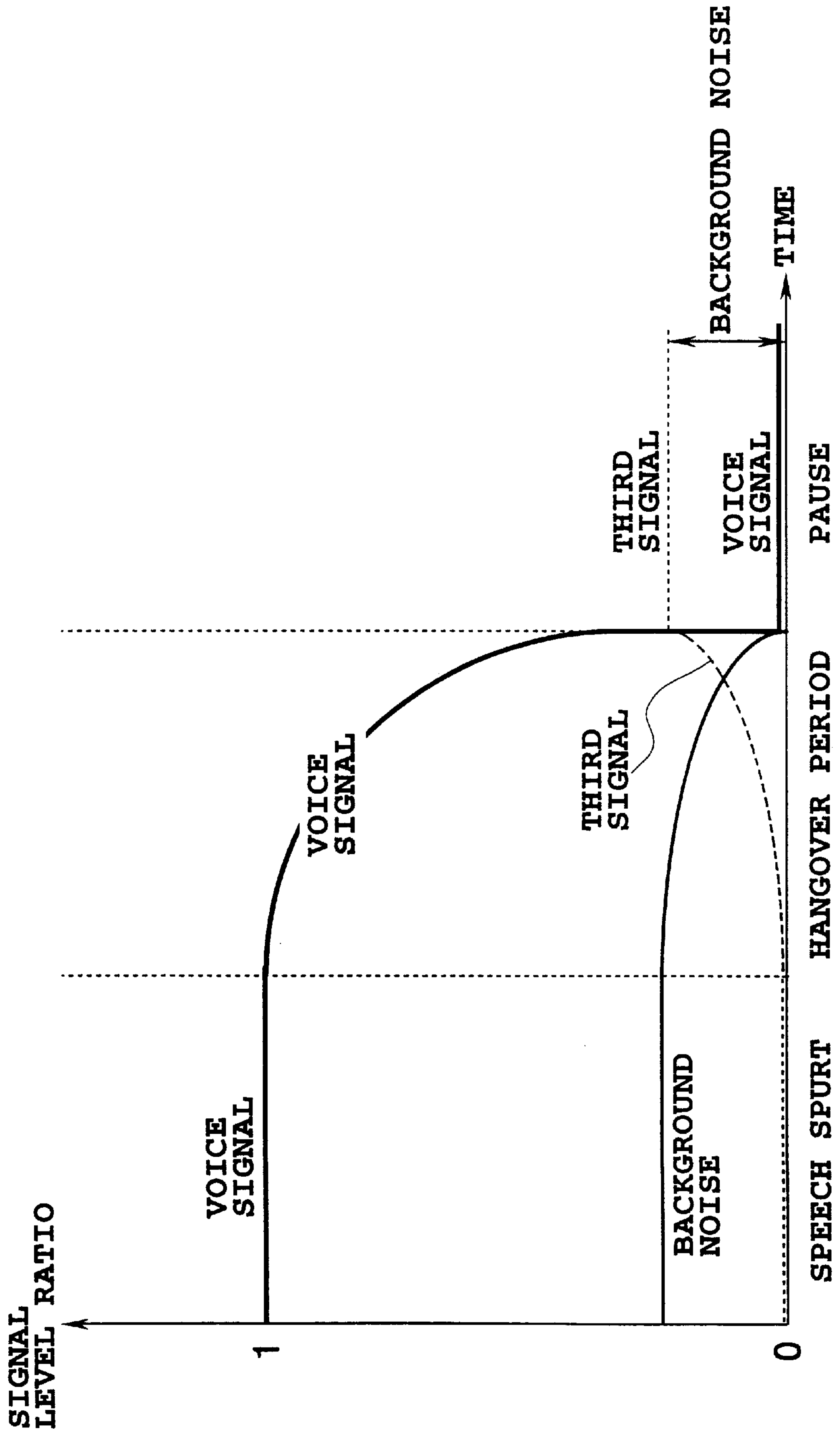
FIG. 5 is a graph illustrating the control of a mixing ratio between the voice signal and third signal in the noise interpolator.

As long as the identification information 902 of the speech spurt, hangover and pause indicates the speech spurt, the voice level adjuster 903 does not attenuate the digital voice signal 901, and the voice signal/third signal combiner 906 mixes it with the third signal which undergoes the maximum attenuation through the third signal level adjuster 905, thereby gaining the greatest intelligibility. In contrast with this, during the hangover period, the voice level adjuster 903 gradually attenuates the voice signal, whereas the third signal level adjuster 905 gradually increases the third signal (noise) until it reaches the level of the background noise as shown in FIG. 5, thereby controlling their mixing ratio. Such control is carried out because the level of the voice signal is expected to be high in the first half of the hangover period, whereas it will decay in its latter half to such a level that it is insignificant for speech recognition. On the other hand, the third signal is gradually increased in the latter half of the hangover period to preserve the continuity in the transition from the speech spurt to the pause, so that the third signal reaches the level of the background noise while the identification information 902 of the speech spurt, hangover and pause indicates the pause.

Figure 6:
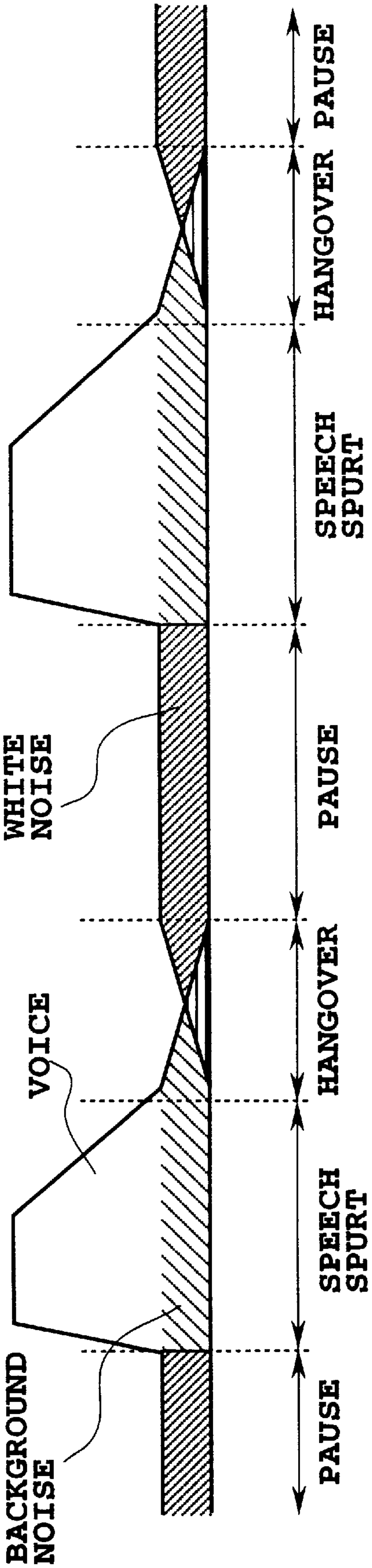
FIG. 6 is a diagram illustrating a reproduced voice signal in the embodiment.

Thus, the reproduced voice has a characteristic as shown in FIG. 6, in which the voice signal is gradually replaced during the hangover periods by the third signal (noise) inserted into the pauses. This makes it possible to reduce the unnaturalness involved in switching between the speech spurts and pauses because of the gradual change in the voice signal and the background noise.

Figure 7:
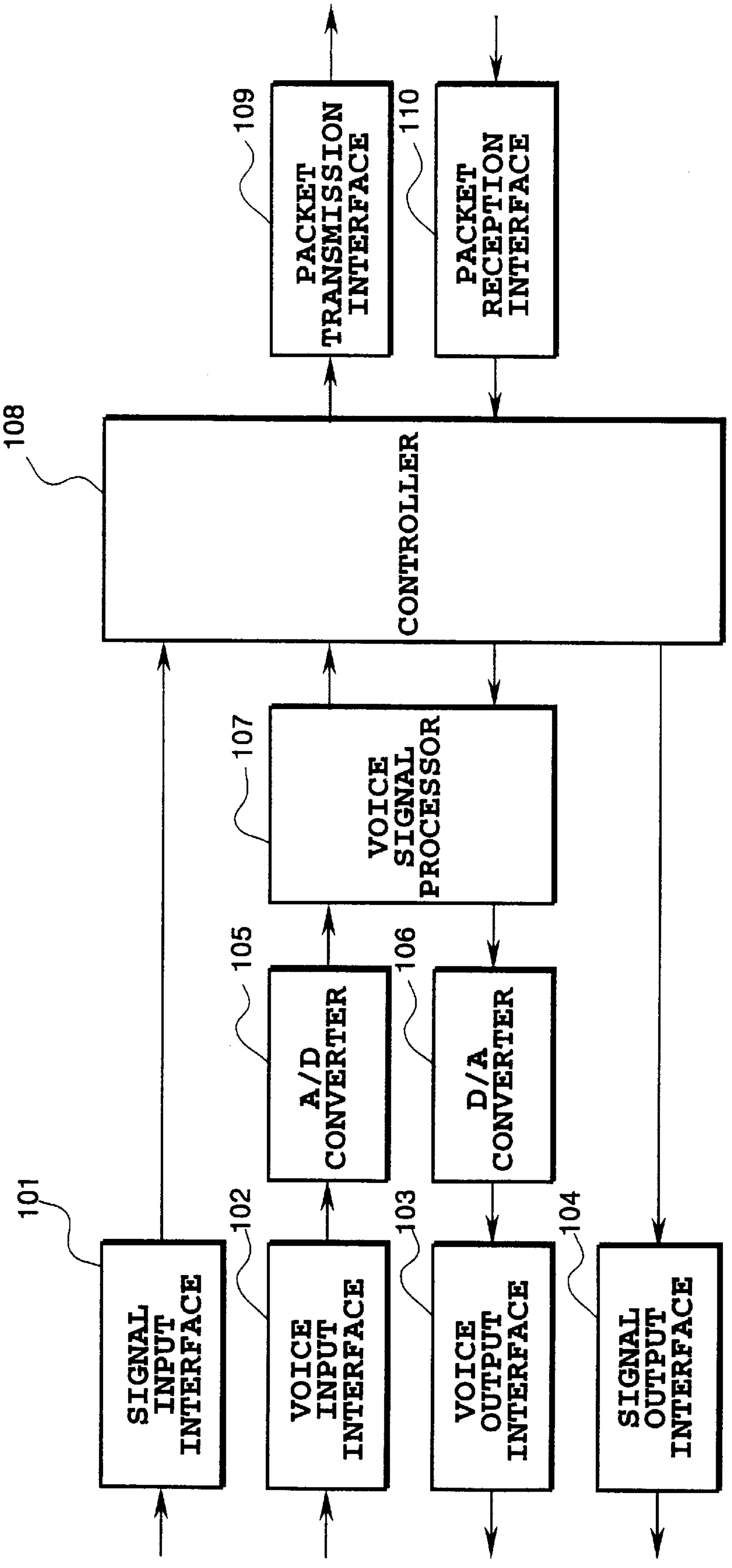
FIG. 7 is a block diagram of a packeting apparatus for implementing the present embodiment.

FIG. 7 is a block diagram showing a configuration of a voice packeting apparatus implementing the present invention.

In FIG. 7, the voice packeting apparatus is connected to a PBX (private branch exchange) through a signal input interface 101, voice input interface 102, voice output interface 103 and signal output interface 104, and to a packet network through a packet transmission interface 109 and packet reception interface 110.

The signal input interface 101 inputs, and the signal output interface 104 outputs, signals such as a seizure signal, digits and answer signal. On the other hand, the voice input interface 102 inputs, and the voice output interface 103 outputs, the voice signal.

The voice signal received by the voice input interface 102 is converted by an A/D converter 105 into a digital signal, and is supplied to a voice signal processor 107. The voice signal processor 107 extracts from the voice signal the speech spurts in which the significant voice signal is present as described above, and supplies them to a controller 108. The voice signal processor 107 also reproduces the voice captured from the packets output from the controller 108 as described above, and supplies it to a D/A converter 106. Thus, the voice signal processor 107 carried out the processing of the voice signal. The voice signal processor 107 can be constructed using a DSP (digital signal processor).

The voice signal converted into the digital signal by the A/D converter 105 is converted into a packet signal by the controller 108. Reversely, a packet signal fed from the packet network is converted into the voice signal and the signals such as the digits by the controller 108. The controller 108 can also be constructed using the DSP or a general purpose processor.

Figure 8:
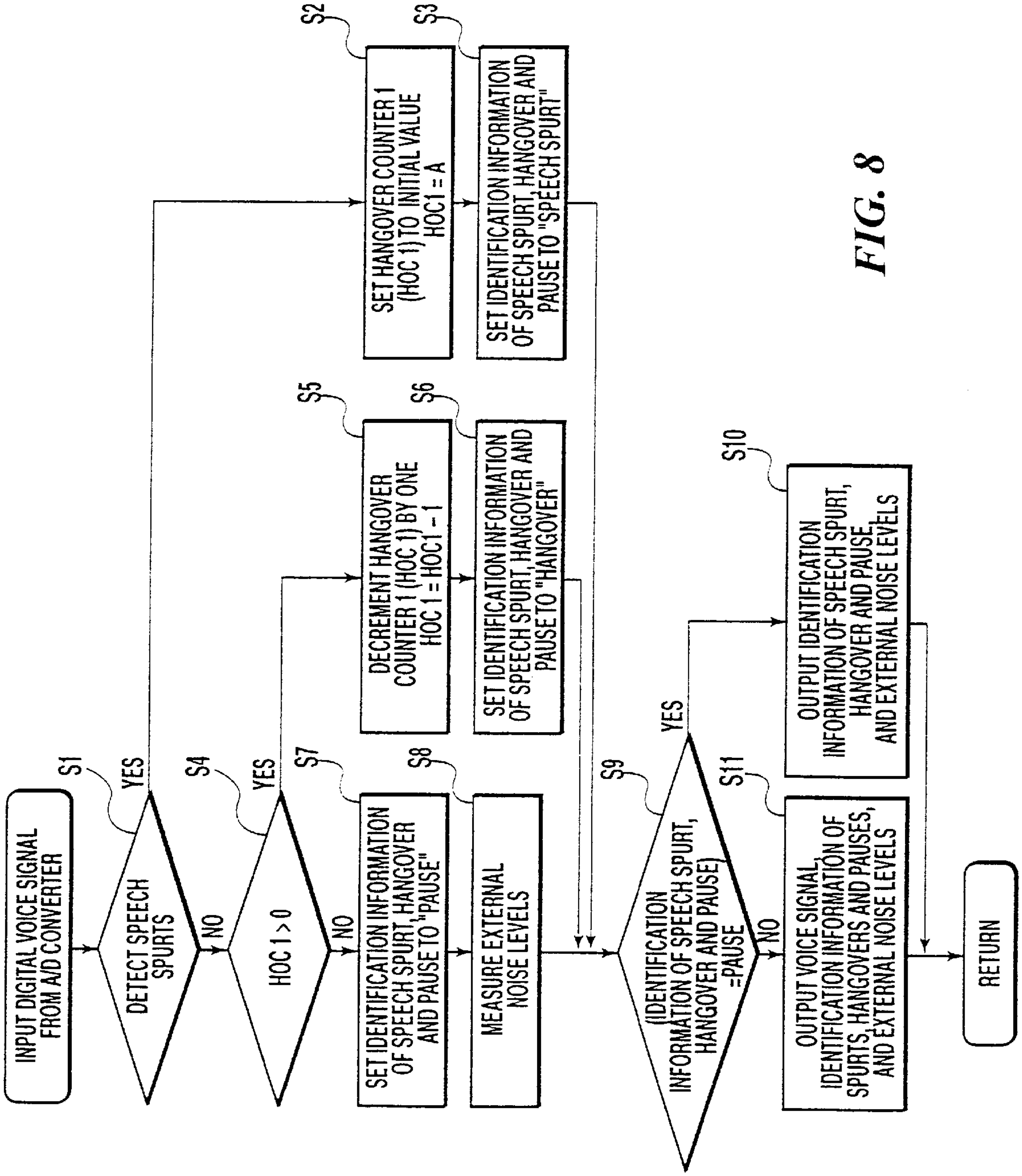
FIG. 8 is a flow chart of the process described at a speech spurt extraction side.
Figure 9:
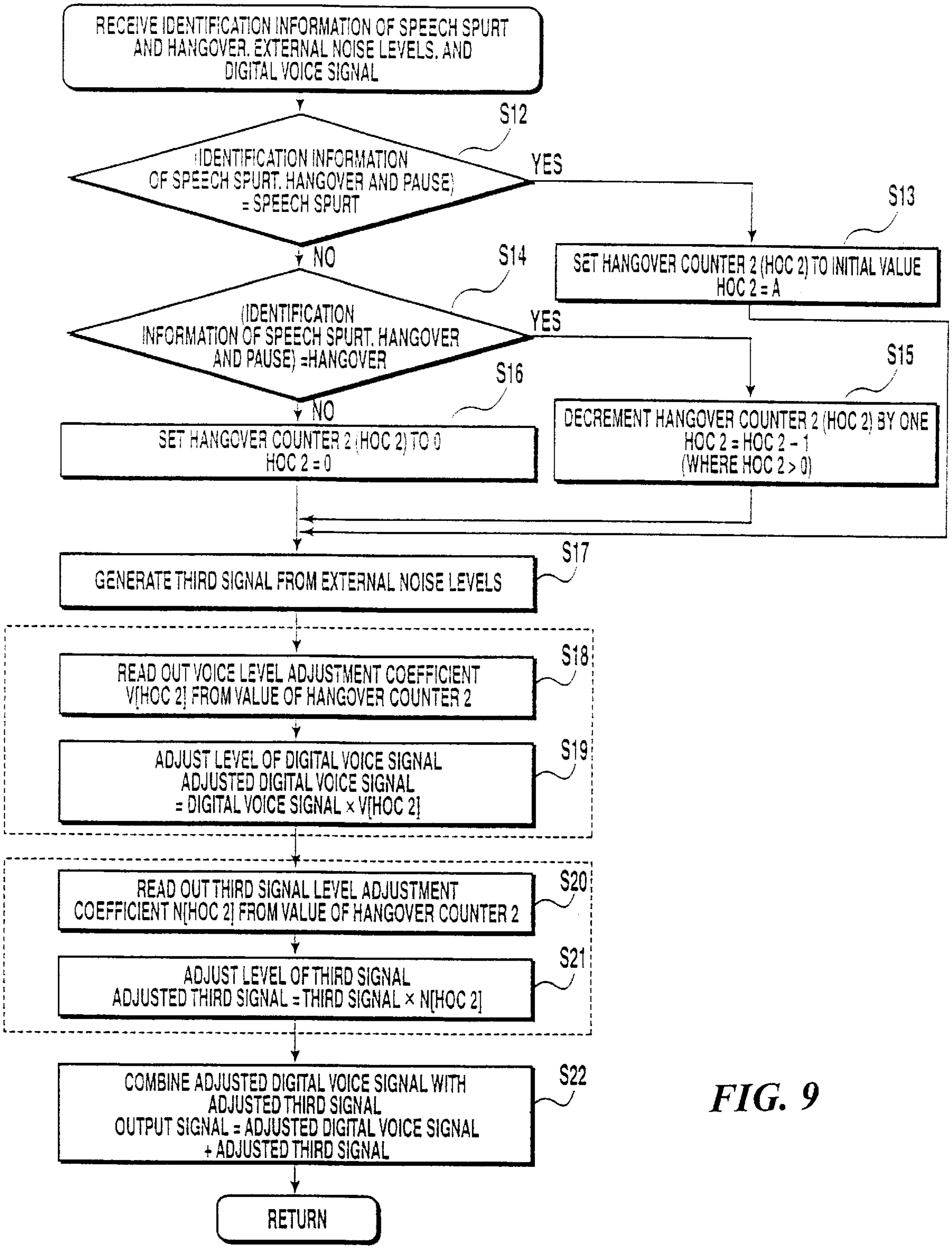
FIG. 9 is a flow chart of the process described at a speech reproduction side.

The following is an explanation of the flow charts of FIGS. 8 and 9, as related to the process previously described.

Referring first to the speech spurt extraction side (FIG. 8):

Step 1:

Decision is made as to whether a digital voice signal is speech spurts or not.

Step 2 and 3:

When speech spurts is detected, the hangover counter 1 is set to initial value A, and identification information os speech spurt, hangover, and pause is set to “the speech spurt”.

Step 4:

When speech spurts is not detected, a value of the hangover counter 1 is checked.

Step 5 and 6:

Where the hangover counter 1>0, the hangover counter 1 is decremented by one, and the identification information of speech spurt, hangover, and pause is set to “the hangover”.

Step 7 and 8:

Where the hangover counter 1 0, the identification information of speech spurt, hangover, and pause is set to “the pause”. Further, background noise level is determined by measuring level of the digital voice signal in “the pause” period.

Step 9:

Decision is made as to whether the identification information of speech spurt, hangover, and pause indicates “the pause” or not.

Step 10:

When the identification information of speech spurt, hangover, and pause indicates “the pause”, the identification information of speech spurt, hangover, and pause, and the background noise level are outputted.

Step 11:

When the identification information of speech spurt, hangover, and pause does not indicate “the pause” (i.e. in the case of the speech spurt or the hangover), the identification information of speech spurt, hangover, and pause, the voice signal, and the background noise level are outputted.

Referring next to the speech reproduction side (FIG. 9):

Step 12:

Decision is made as to whether the identification information of speech spurt, hangover, and pause indicates “the speech spurt” or not.

Step 13:

When the identification information of speech spurt, hangover, and pause indicates “the speech spurt”, the hangover counter 2 is set to initial value A.

Step 14:

Decision is made as to whether the identification information of speech spurt, hangover, and pause indicates “the hangover” or not.

Step 15:

When the identification information of speech spurt, hangover, and pause indicates “the hangover”, the hangover counter is decremented by one.

Step 16:

When the identification information of speech spurt, hangover, and pause fails to indicate “the speech spurt” or “the hangover” (i.e. indicates “the pause”), the hangover counter 2 is set to 0.

Step 17:

A third signal is generated from the transmitted background noise level.

Step 18:

A voice level adjustment coefficient is determined from the value of the hangover counter 2.

Step 19:

The level of the digital voice signal is adjusted by multiplying the digital voice signal with the voice level adjustment coefficient. When the hangover counter 2 is “A”, the voice level adjustment coefficient becomes “1”, so that the digital voice signal is outputted as it is as a result. On the contrary, when the hangover counter 2 is “)”, the voice level adjustment coefficient becomes “0”, so that the digital voice signal is not outputted as a result.

Step 20:

A third signal level adjustment coefficient is determined from the value of the hangover counter.

Step 21:

The level of the third signal is adjusted by multiplying the third signal with the third signal level adjustment coefficient. When the hangover counter 2 is “A”, the third signal level adjustment coefficient becomes “0”, so that the digital voice signal is not outputted as a result. On the contrary, when the hangover counter 2 is “0”, the voice level adjustment coefficient becomes “1”, so that the third signal is outputted as it is as a result.

Step 22:

The adjusted voice signal and the adjusted third signal are mixed and outputted.

The following is list of the above variables:

(1) HOC1: Hangover counter at the speech spurt extraction side, for counting an elapsed time for a hangover period.

(2) HOC2: Hangover counter at the speech reproduction side, for counting an elapsed time for a hangover period.

(3) N[ ]: Third signal level adjustment coefficient. Level of a third signal is adjusted by multiplying the third signal with this coefficient.

(4) V[ ]: Voice level adjustment coefficient. Level of a digital voice signal is adjusted by multiplying the digital voice signal with this coefficient.

The following is a list of constants:

(1) A: Initial value of the hangover counters. A parameter (A>0) which defines duration of a hangover period.

[Third signal level adjustment coefficient and voice level adjustment coefficient]
Relationship of HOC2 with N[] or V[]

| Hangover counter 2(HOC2) | Third Signal Level Adjustment Coefficient | Voice Level Adjustment Coefficient |
|---|---|---|
| A | N[A] | V[A] |
| A-1 | N[A-1] | V[A-1] |
| . | . | . |
| . | . | . |
| . | . | . |
| 1 | N[1] | V[1] |
| 0 | N[0] | V[0] |

Where:
N[A] < N[A-1] < . . . < N[1] < N[0]
V[A]> V[A-1] > . . . > V[1] > V[0]
N[A] = 0, N[0] = 1
V[A] = 1, V[0] = 0

Where:

$$N[A]<N[A-1]< \ldots <N[1]<N[0]$$

$$V[A]>V[A-1]> \ldots >V[1]>V[0]$$

$$N[A]=0, N[0]=1$$

$$V[A]=1, V[0]=0$$

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A speech spurt extraction and speech reproduction method comprising the steps of, at a speech spurt extraction side:

extracting speech spurts consisting of significant speech in a voice signal;

extracting speech during hangover periods defined as a particular period immediately following transitions of said speech spurts to pauses;

measuring incoming external noise levels during the pauses; and producing an extracted voice signal consisting of the extracted speech spurts and extracted speech during the hangover periods, producing measured results of the external noise levels, and producing information for identifying the speech spurts, hangover periods and pauses, and at a speech reproduction side:

deciding the speech spurts, hangover periods and pauses;

generating a third signal from the external noise levels transmitted;

adjusting levels of the extracted voice signal during the hangover periods;

adjusting the third signal during the hangover periods; and producing during the speech spurts the extracted voice signal, producing during the hangover periods a mixture of the extracted voice signal and the third signal, which undergo adjustment, and producing in the pauses the third signal.

2. A speech spurt extraction method comprising the steps of:

extracting speech spurts consisting of significant speech in a voice signal;

extracting speech during hangover periods defined as a particular period immediately following transitions of said speech spurts to pauses;

measuring incoming external noise levels during the pauses; and producing an extracted voice signal consisting of the extracted speech spurts and extracted speech during the hangover periods, producing measured results of the external noise levels, and producing information for identifying the speech spurts, hangover periods and pauses.

3. A voice reproduction method for reproducing a voice signal from an extracted voice signal consisting of speech spurts and speech during a hangover periods, from measured results of external noise levels, and from information for identifying the speech spurts, hangover periods and pauses, said voice reproduction method comprising the steps of:

generating a third signal from the external noise levels transmitted;

adjusting levels of the extracted voice signal during the hangover periods;

adjusting the third signal during the hangover periods; and producing during the speech spurts the extracted voice signal, producing during the hangover periods a mixture of the extracted voice signal and the third signal, which undergo adjustment, and producing in the pauses the third signal.

4. A speech spurt extraction apparatus comprising:

voice level measuring means for detecting speech spurts consisting of significant speech in a voice signal, and for measuring incoming external noise levels during pauses;

voice extracting means for extracting said speech spurts and speech during hangover periods defined as a particular period immediately following transitions of said speech spurts to the pauses; and output means for producing an extracted voice signal consisting of the extracted speech spurts and extracted speech during the hangover periods, for producing measured results of the external noise levels, and for producing information for identifying the speech spurts, hangover periods and pauses.

5. The speech spurt extraction apparatus as claimed in claim 4, wherein said output means produces a voice packet with a header to which said information for identifying the speech spurts, hangover periods and pauses is added.

6. A voice reproduction apparatus for reproducing a voice signal from an extracted voice signal consisting of speech spurts and speech during a hangover periods, from measured results of external noise levels, and from information for identifying the speech spurts, hangover periods and pauses, said voice reproduction apparatus comprising:

a signal generator for generating a third signal in response to the external noise levels transmitted;

voice level adjuster for adjusting levels of the extracted voice signal during the hangover periods;

a third signal level adjuster for adjusting the third signal during the hangover periods;

a mixer for mixing the voice signal and the third signal, which undergo the level adjustments; and a combiner for producing during the speech spurts the extracted voice signal, for producing during the hangover periods a mixture of the extracted voice signal and the third signal, which undergo the level adjustments, and for producing in the pauses the third signal.

7. The voice reproduction apparatus as claimed in claim 6, wherein said voice reproduction apparatus receives the voice packet with a header to which said information for identifying the speech spurts, hangover periods and pauses is added.

* * * * *